Feb. 11, 1969   A. L. WHEAR   3,426,539
MOISTURE ACTUATED DEVICE
Filed Feb. 2, 1965
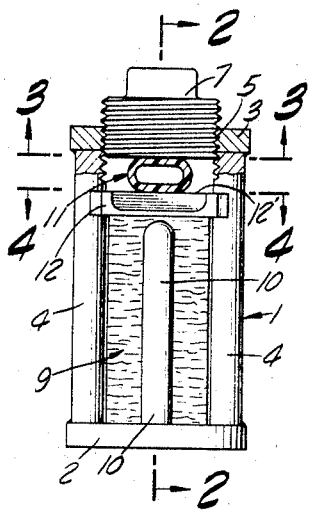
FIG. 1.
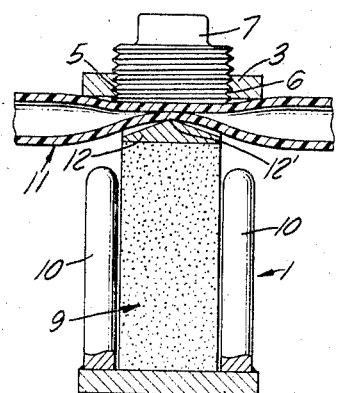
FIG. 2.
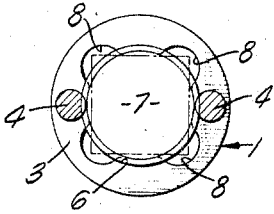
FIG. 3.
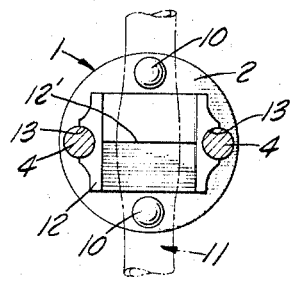
FIG. 4.
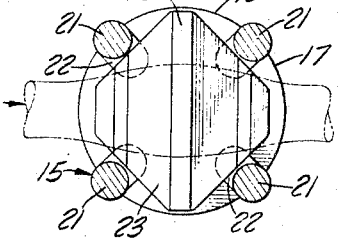
FIG. 8.
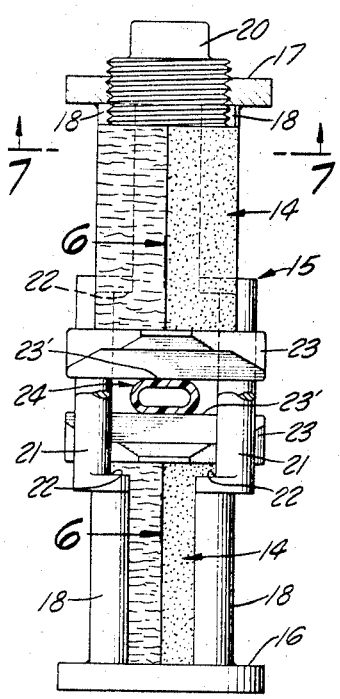
FIG. 5.
FIG. 6.
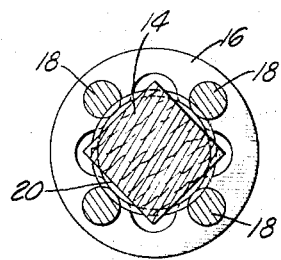
FIG. 7.
INVENTOR.
ALFRED L. WHEAR
BY
Paul A. Weilein
ATTORNEY "United States Patent Office"
3,426,539
Patented Feb. 11, 1969

3,426,539
MOISTURE ACTUATED DEVICE
Alfred L. Whear, P.O. Box 366, Minden, Nev. 89423
Filed Feb. 2, 1965, Ser. No. 429,747
U.S. Cl. 61—13                                        11 Claims
Int. Cl. E02b 13/02

ABSTRACT OF THE DISCLOSURE

A moisture responsive sensor to control an underground irrigation system is buried in the soil and comprises an open plastic cage straddling a resiliently collapsible tube of the irrigation system and confining moisture responsive means that expands to actuate jaw means to pinch and close the resilient tube, the jaw means being guided by the plastic cage.

---

This invention relates to moisture responsive actuators of the type shown in my pending application for U.S. Letters Patent, Ser. No. 116,428, filed June 12, 1961, now Patent No. 3,204,872, wherein the actuator is particularly adapted for controlling the operation of an irrigation system when embedded in the ground so as to be responsive to ambient moisture in the area in which it is embedded.

The actuator shown in the aforementioned application is characterized by an open frame or support in which is contained moisture responsive means that will expand and contract according to moisture content thereof, a valve body connected with the support, a flow passage through the valve body, and valve means in the valve body including a diaphragm and valve seat arranged so that the diaphragm will move toward and away from the valve set to control flow through the flow passage according to expansion and contraction of said moisture responsive means.

It is an object of the present invention to provide an improved moisture actuated device of the character next above described and which is of simple, inexpensive, and compact form including a novel arrangement of an open frame or support, moisture responsive means operable to expand and contract according to moisture content, wherein the improvement resides in the combination with such a moisture responsive member in an open body of opposing surfaces engageable with a section of conduit disposed therebetween to apply deforming pressures to the conduit section whereby to close off the flow passage through the conduit.

Another object of this invention is the provision of a device of the character herein noted wherein means carried by the open support together with the moisture responsive means constitutes novel means that will accommodate and apply to a collapsible resilient conduit forming a part of an irrigation system, a force for deforming the conduit for controlling flow therethrough in response to expansion and contraction of the moisture responsive means.

Another object is to provide as one form of the present invention a moisture actuated device in which an elongate open frame or support closed at one end and open at the other contains an elongate block of redwood bark having all fibers extending transversely thereof, also a force applying jaw engaged with one end of the block and movable axially in the support, there being a plug adjustable axially in the open end of the support and providing between the plug and the jaw a space in which a portion of a resilient and collapsible conduit may be disposed for contact with said plug and said jaw. With this arrangement, flow through the conduit will be controlled according to the collapsing thereof as effected by the plug and said jaw in the expansion and contraction of the block in response to moisture content of the block.

Further, it is an object of this invention to provide a moisture actuated device wherein a pair of elongate blocks of redwood bark, having all fibers disposed substantially transversely thereof, are mounted in an elongate open support that is closed at one end and provided with an axially adjustable plug in the other end, the blocks having their outer ends engageable with the plug and the closed end of the support respectively. These blocks provide between their inner ends a space for reception of opposed axially movable jaws engageable with the inner ends of the blocks and adapted to receive therebetween and to contact a portion of a collapsible resilient conduit for passing fluid therethrough. With this construction and arrangement the jaws will apply forces for collapsing the portion of the conduit therebetween and thereby controlling flow therethrough upon expansion and contraction thereof in response to the moisture content of the blocks.

This invention is also characterized by a novel form of open frame or support for the working elements of the moisture actuated device, this open support being elongate and having at one end a closure plate and at its other end a plate having an opening therein to receive a threaded and axially adjustable plug, there being a plurality of spaced rods extending between and joined to the end plates for holding therebetween the moisture responsive means and associated force applying means.

In the form of this invention employing a single moisture responsive block, a pair of spaced rods in addition to a pair of spaced rods joined to the end plates extend upwardly from the closure plate and terminate short of the other end plate to provide a space between upper ends thereof and the plug to permit of a collapsible resilient conduit being extended freely through that space and between the rods joined to the end plates, there also being in this space a jaw interposed between the conduit and the adjacent end of the block for applying a compressive force to the conduit according to expansion of the block in response to moisture content thereof, the jaw being guided between the rods joined to the end plates.

In the form of this invention employing a pair of opposed moisture responsive blocks, all of the rods extend between and are joined to the end plates of the support and act as guides for the axially movable elements in the support and at the same time fully expose the blocks while maintaining them in place. In this support the rods are laterally outwardly offset between their ends to enlarge the space therebetween for reception of the pair of jaws which are of greater width than the blocks and are guided between offset portions.

Other objects and advantages of the invention will be hereinafter described or will become apparent to those skilled in the art, and the novel features of the invention will be defined in the appended claims.

Referring to the drawings:

FIG. 1 is a side elevation partly in section of a moisture actuated device embodying the present invention with a collapsible conduit disposed therein in position to be collapsed;

FIG. 2 is a longitudinal sectional view taken on the line 2—2 of FIG. 1, but showing the device as when actuated to collapse and close the conduit;

FIG. 3 is a cross-sectional view taken on the line 3—3 of FIG. 1;

FIG. 4 is a cross-sectional view taken on the line 4—4 of FIG. 1;

FIG. 5 is a fragmentary side elevational view partly in section of a modified form of moisture actuated device embodying the present invention, showing a collapsible conduit therein;

FIG. 6 is a fragmentary sectional view taken on the line 6—6 of FIG. 5 showing the conduit in a collapsed state to stop flow therethrough;

FIG. 7 is a cross-sectional view taken on the line 7—7 of FIG. 5; and

FIG. 8 is a cross-sectional view taken on the line 8—8 of FIG. 6.

One form of the present invention as shown in FIGS. 1 through 4 includes an elongate open cage or frame or support generally designated 1 and having a closure plate 2 at one end and a similar but open plate 3 at its other end, the two plates being joined by a pair of rods 4 suitably fixed to the plates and diametrically opposite one another.

The open end plate 3 has screw threads 5 in the opening 6 therein for reception of a plug 7 axially adjustable in the opening for a purpose to be hereinafter described. The opening 6 is also provided with four notches 8 whereby the opening will accommodate the insertion into the support of moisture responsive means, here shown as an elongate block 9 of the bark of a redwood tree and which is substantially square in cross-section, with all of the fibers extending substantially transversely thereof. This insertion of the block 9 is effected when the plug 7 is removed, after which the plug is screwed into the opening.

In addition to the pair of rods 4, two shorter rods 10 are spaced from one another and the rods 4 and arranged so that each is fixed to closure plate 2 and extends upwardly therefrom so that the upper end thereof is well spaced from the open end plate 3. With this arrangement of rods 3 and 4, a space is provided between the upper ends of rods 10 and the end plate 3 to accommodate the mounting in such space of a portion of a collapsible and resilient tube or conduit 11 for passing liquid or other fluid therethrough. The conduit 11 may be connected to a source of supply of fluid, not shown, and serve as part of an irrigation system. In positioning the deformable conduit 11 in the support 1, it is extended between the opposed rods 4 as in FIGS. 1 and 4 and is clear of the upper ends of the short rods 10 so that the surface of the conduit opposite the plug 7 is engageable with the inner end of this plug.

In accordance with this invention, the support 1 as here provided, is deemed to carry or provide in association therewith, means which permits of the positioning of the conduit therein and causes the conduit to be collapsed and released from collapsed condition to control flow through the conduit. As here shown, this means for accommodating the conduit and applying collapsing forces thereto includes the construction and arrangement of the support 1, the block 9, the plate 3, and a jaw 12, the latter being axially movable between the rods 4 for engagement with the conduit 11. Notches 13 formed in the jaw 12 receive the rods 4 therein whereby the jaw is guided by and freely slidably movable on the rods while engaged with the end of the block 9 opposite thereto. The jaw 12 is provided with a ridge 12' shaped to localize the collapsing pressure of the jaw and assure that the conduit will be collapsed as desired to control flow therethrough. When the block 9 expands to the extent shown in FIG. 2, the jaw is disposed so that the conduit 11 will be collapsed to shut off flow therethrough.

It will be noted that the cage has openings immediately adjacent the moisture responsive means of sufficient area to expose the major portion of the side surfaces of the responsive means, the openings being adjacent the moisture responsive means to permit the soil in which the device is buried to make intimate contact with the moisture responsive means for efficient transfer of moisture from the soil to the responsive means. With reference to the free admission of soil into the cage, it is to be further noted that the two jaws that collapse the resilient tube are tapered or generally wedge shaped in cross sectional configuration so that the leading portions of the jaws displace soil out of their paths of movement. Thus, although soil freely enters the cage, the jaws act on the soil to keep the soil from interfering with the action of the jaws. It is to be further noted that the jaws are in sliding engagement with the surrounding cage for guidance of the jaws and that the intermittent movements of the jaws keep the guiding surfaces clean.

A modified form of this invention as shown in FIGS. 5 through 8 employs a pair of the redwood blocks 14 having the same characteristics as the block 9 shown in FIGS. 1–4, and which are mounted in opposed spaced relation to one another in an open support 15 similar to the support 1 shown in FIGS. 1 through 4. The support 15 includes a closure plate 16 at one end, an open end plate 17 at the other end and four rods 18 suitably secured as by welding or other means to the plates 16 and 17. The open end plate 17 is provided with an adjustable plug 20 in the same arrangement as shown in FIGS. 1 through 4.

Between their ends the rods 18 have portions 21 which are laterally outwardly offset and define shoulders 22 at the juncture of portions 21 with the remainder of the rods. This arrangement provides between the opposed ends of the two blocks 14 a space for accommodating a pair of axially movable jaws 23 and a portion of a collapsible and resilient fluid conduit 24. The jaws 23 may contact both shoulders 22 if the plug 20 is adjusted to a certain outwardly disposed position. Each jaw is provided with a ridge 23' extending across the face thereof opposed to the conduit 24 to assure the application of a collapsing pressure for effectively controlling flow through the conduit. FIG. 6 shows that the jaws 23 have been moved axially to collapse the conduit to shut off flow therethrough in response to moisture content of the blocks. In this form of the device the blocks 14 are insertable endwise through the open end plate 17 when the plug 20 is removed.

When the device as shown in FIGS. 1 through 4 or the modified form as shown in FIGS. 5 through 8 is suitably embedded in the ground and the collapsible conduit forms a part of the supply line of an irrigation system, the conduit will be collapsed and released from collapsed state according to expansion and contraction of the moisture responsive block or blocks that are fully exposed to ambient moisture in the ground and will effect the desired control of flow through the conduit and irrigation system.

Adjustment of the plug 7 as shown in FIGS. 1 and 2, regulates the action of the device as by this adjustment the plug may be moved toward or away from the jaw 12. Similarly, the plug 20, as shown in FIG. 5 may be adjusted axially to control the action of the two blocks 14, one of the two jaws 23 being moved relative to the other jaw in response to such adjustment.

The resilient deformable conduit 11 or 24 in the two illustrative embodiments may be of various normal sizes and configurations. In this connection, it will be understood that the embodiment of FIGS. 5 through 8 is one in which the net effective stroke of the moisture reactive actuator elements is greater than the net reactive stroke of the embodiment shown in FIGS. 1 through 4. Assuming in this regard that the redwood bark actuator elements in the two embodiments are of the same size, then it would be apparent that the net stroke of the latter embodiment would be twice that of the former embodiment. The conduit 11 or 24 in the two embodiments may be initially circular in cross-section but may be preliminarily deformed as shown in FIG. 1 and in FIG. 5 to an oval form without materially effecting the flow area through the conduit. Such initial deformation, it will be understood, is accomplished by the adjustor plugs 7 and 20. If desired, however, it will be further apparent that the conduit may be of other than circular cross-section and may include an initial and permanently deformed section adapted to cooperate with the jaw means of the two devices.

It should be noted that in both forms of the actuator, the force applying means is entirely dependent for its actuation upon the moisture content thereof as effected by the moisture in the ground in which the actuator is embedded. Moreover, the time required for moisture in the ground to cause actuation of the force applying means sufficient to control flow through the conduit is substantially in keeping with the time required for changes in the moisture content of the ground, with the result that irrigation is effected only when needed and to a reliably controlled extent.

The redwood actuator element referred to above and designated 9 and 14 in the respective embodiments herein illustrated is preferably constituted by a rectangular section of the bark of a redwood tree which has been cut on a radial line relative to the axis of the redwood tree, whereby the bark fibers are all or substantially all disposed in transverse relation to the major axis of the redwood bark element, all as more particularly described in my above identified pending application.

It will now be apparent that a moisture responsive actuator made in accordance with this invention and comprising a simply constructed open frame or support and an absorptive moisture responsive force applying means, makes its possible to provide a reliable valve action with an exceptionally novel and inexpensive valve means for effecting flow control as in an irrigation system according to the moisture content of the force applying means and that portion of the ground in which the actuator is embedded.

While specific structural details have been shown and described, it should be understood that changes and alterations may be resorted to without departing from the spirit of the invention as defined in the appended claims.

I claim:
1. The combination with a bed of soil of:
an underground irrigation system to provide the soil with moisture to support plant life;
a resiliently collapsible tube included in said system and buried in the bed of soil, said tube being connected to a source of water under pressure;
an open support structure straddling the tube;
first means in the form of a substantially rigid jaw element in the support structure in abutment with one side of the tube and slidably guided by said support structure for movement toward and from said tube;
second substantially rigid means in the support structure opposite from the jaw element and in abutment with the opposite side of the tube;
absorptive moisture responsive means in said open support and thereby exposed to soil surrounding said support operable in response to rising moisture content therein and extending between said jaw element and a portion of said support structure to expand against said jaw element to slide the jaw element towards said second means to collapse the tube therebetween to cut off flow through the tube; and
manually operable means to adjust the position of said second means toward and from said tube.

2. A combination as set forth in claim 1:
in which said second means is a second jaw element;
in which said moisture absorptive responsive means comprises two separate bodies positioned to expand against the two jaw elements respectively; and
in which said manually operable adjustment means acts against one of said bodies to vary the position of the corresponding jaw element.

3. A combination as set forth in claim 2 in which both of said jaws are generally wedge shaped to displace intervening soil laterally away from the jaws in response to closing action of the jaws.

4. The combination of claim 1 in which said cage is made of plastic material.

5. The combination as set forth in claim 1 in which the side openings of the cage extend along substantially the full length of the responsive means to facilitate entry of soil into the cage.

6. The combination as set forth in claim 1 in which said cage comprises:
two opposite end members confining the responsive means longitudinally; and
elongated members extending from the end members longitudinally of the responsive means,
at least some of said elongated members interconnecting the two end members to unify the cage.

7. The combination as set forth in claim 6 in which said responsive means is of polygonal cross sectional configuration and each of said elongated members extends along one of the side of the responsive means.

8. The combination as set forth in claim 6 in which said responsive means is of rectangular cross section and said elongated members comprise four rods each extending along one of the four sides of the responsive means.

9. The combination as set forth in claim 1 in which said actuating member has a tapered leading side to displace soil out of its path of movement.

10. The combination as set forth in claim 1:
wherein said responsive means comprises two elongated responsive members in longitudinal alignment with each other;
wherein said conduit is a resiliently collapsible tube extending between the two responsive members;
and which includes two actuating members in the form of two jaws adjacent the inner ends of the two responsive members respectively for actuation thereof to collapse the tube;
said cage having inner longitudinal guide surfaces in sliding contact with the two jaws for guidance thereof.

11. The combination as set forth in claim 10 in which said jaws are generally wedge shaped in configuration to displace soil laterally out of their paths.

References Cited

UNITED STATES PATENTS

| | | |
|---|---|---|
| 2,445,717 | 7/1948 | Richards. |
| 1,337,247 | 4/1920 | Maier _____ 251—8 |
| 1,718,389 | 6/1929 | Spaulding _____ 73—337 X |
| 2,197,995 | 4/1940 | Crowley _____ 251—7 |
| 2,396,544 | 3/1946 | Voyle et al. _____ 251—7 X |
| 3,204,872 | 9/1965 | Whear _____ 137—78 X |
| 3,273,849 | 9/1966 | Hansson _____ 251—4 |

FOREIGN PATENTS

| | | |
|---|---|---|
| 163,965 | 10/1953 | Australia. |
| 1,027,948 | 4/1958 | Germany. |

EARL J. WITMER, *Primary Examiner.*

U.S. Cl. X.R.

251—7